(12) United States Patent
Mitomi et al.

(10) Patent No.: US 7,002,731 B2
(45) Date of Patent: Feb. 21, 2006

(54) OPTICAL MODULATORS

(75) Inventors: Osamu Mitomi, Nagoya (JP); Kenji Aoki, Ogaki (JP); Jungo Kondo, Nishikamo-gun (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 66 days.

(21) Appl. No.: 10/683,267

(22) Filed: Oct. 14, 2003

(65) Prior Publication Data

US 2005/0047703 A1 Mar. 3, 2005

(30) Foreign Application Priority Data

Nov. 5, 2002 (JP) ............................. 2002-320930
Oct. 6, 2003 (JP) ............................. 2003-346736

(51) Int. Cl.
 *G02F 1/00* (2006.01)
 *G02F 1/035* (2006.01)

(52) U.S. Cl. ........................................ 359/322; 385/2
(58) Field of Classification Search ............... 385/1–3, 385/9, 14, 15, 16, 27, 31, 39, 40, 41, 130, 385/131, 132, 418; 359/322, 244, 245
See application file for complete search history.

(56) References Cited

U.S. PATENT DOCUMENTS

| 5,790,719 | A | * | 8/1998 | Mitomi et al. ................ 385/2 |
| 6,219,469 | B1 | | 4/2001 | Minakata et al. |
| 6,400,494 | B1 | * | 6/2002 | Kondo et al. ............... 359/322 |
| 2002/0159738 | A1 | | 10/2002 | Aoki et al. |
| 2003/0044100 | A1 | | 3/2003 | Kondo et al. |

FOREIGN PATENT DOCUMENTS

| JP | A 10-133159 | 5/1998 |
| JP | B2 3088988 | 7/2000 |

* cited by examiner

*Primary Examiner*—Georgia Epps
*Assistant Examiner*—Tuyen Tra
(74) *Attorney, Agent, or Firm*—Oliff & Berridge, PLC

(57) ABSTRACT

An object of the present invention is to improve the modulation efficiency of an optical modulator in a high frequency band while satisfying the velocity matching condition. An optical modulator is provided having an optical waveguide for propagating light, an electrode for applying a voltage on the waveguide for modulating the light, a signal source electrically connected to the electrode and a terminating resistance electrically connected to the electrode. The signal source has a characteristic impedance Zi and the terminating resistance has an impedance Zl satisfying the formula (Zi<Zl). Alternatively, the signal source has a characteristic impedance Zi and the electrode has a characteristic impedance Zc satisfying the formula (Zi<Zc).

31 Claims, 8 Drawing Sheets thickness of lithium niobate main body [μm]

OPTICAL MODULATORS

CROSS-REFERENCE TO RELATED APPLICATIONS

This application claims the benefits of Japanese Patent Application P2002-320930 filed on Nov. 5, 2002, and P2003-346736 filed on Oct. 6, 2003, the entireties of which are incorporated by reference.

BACKGROUND OF THE INVENTION

1. Field of the Invention

The present invention relates to an optical modulator.

2. Related Art Statement

A traveling-wave optical modulator using lithium niobate ($LiNbO_3$), lithium tantalate ($LiTaO_3$) or gallium-arsenide (GaAs) for the optical waveguide has excellent properties and may realize a broadband modulation at a high efficiency. Lithium niobate and lithium tantalate are excellent ferroelectric materials having large electrooptic coefficients and can control light within a short optical path. Factors suppressing the modulation frequency of the traveling-wave optical modulator include velocity mismatch, dispersion, electrode conductor loss and dielectric loss.

The assignee filed a Japanese patent publication 10-133, 159A (U.S. Pat. No. 6,219,469). The publication disclosed a travelling wave optical modulator with an optical waveguide substrate having a thinner portion with a thickness of not more than 10 $\mu$m where the optical waveguide is formed. It is thereby possible to realize high-speed modulation without forming a buffer layer made of silicon dioxide, and to advantageously reduce the product "$V\pi \cdot L$" of a driving voltage $V\pi$ and a length of an electrode "L".

Further, Japanese Patent number 3088988 disclosed a travelling wave type optical modulator having an electrode for modulation and its terminating portion. The terminating portion has a characteristic impedance Zl lower than the characteristic impedance Zc of the electrode (Zl<Zc).

SUMMARY OF THE INVENTION

However, in a high frequency band higher than 1 GHz, the modulation efficiency is generally low when the modulating electrode applies a modulating signal on light. It is thus needed to apply a high driving voltage thereon. It is thus necessary to improve the modulation efficiency in a high frequency band while satisfying the velocity matching condition.

An object of the present invention is to improve the modulation efficiency of an optical modulator in a high frequency band while satisfying the velocity matching condition.

A first aspect of the present invention provides an optical modulator having an optical waveguide for propagating light, an electrode for applying a voltage on the waveguide for modulating the light, a signal source connected to the electrode and a terminating resistance connected to the electrode. The signal source has a characteristic impedance Zi and the terminating resistance has an impedance Zl satisfying the following formula.

$$Zi<Zl$$

A second aspect of the present invention provides an optical modulator comprising an optical waveguide for propagating light, an electrode for applying a voltage on the waveguide for modulating the light, a signal source connected to the electrode and a terminating resistance connected to the electrode. The signal source has a characteristic impedance Zi and the electrode has a characteristic impedance Zc satisfying the following formula.

$$Zi<Zc$$

The inventors have studied proportions of characteristic impedances over the whole of an optical modulator and reached the following discovery. When the impedance Zl of a terminating resistance or the characteristic impedance Zc of a modulating electrode is made larger than the characteristic impedance Zi of a signal source, it is possible to improve the modulating efficiency of an optical modulator in a high frequency band while satisfying the velocity matching condition. The present invention is based on the discovery.

As schematically shown in FIG. 1, an optical modulation system has a signal source, a main body having a modulating electrode, and a terminating resistance. In a prior art, the signal source has a characteristic impedance Zi of 50 $\Omega$, the modulating electrode has a characteristic impedance Zc of 40 to 45 $\Omega$, and the terminating resistance has an impedance Zl of about 50 ohm.

The inventors, however, have simulated the change of modulating efficiency on an optical modulator for processing a high frequency signal. For example, they tried to simulate the change of modulating efficiency for a signal of 30 GHz. A modulation efficiency where Zc=Zi=Zl is selected as a reference. The results of the simulation are shown in table 1. It was found that the modulation efficiency may be improved by 3 dB when Zc/Zi=1.4 and Zl/Zi=1.4 with respect to the reference. According to the results, it is possible to drive the optical modulator at a driving voltage of only 0.7 times of the voltage needed for driving a modulator where Zc=Zi=Zl.

On the other hand, according to the proportions of impedances applied in an optical modulator disclosed in Japanese Patent number 3088988, the impedances Zi of a signal source and Zc of an electrode are the same value and Zl<Zc. Such condition corresponds with Zc/Zi=1 and Zl/Zi=0.6 in data simulation shown in table 1, where the modulation efficiency is lower than the reference by 1.9 dB. That is, the modulation efficiency is made lower than the reference where Zc=Zi=Zl so that a higher driving voltage is needed.

In a preferred embodiment, the modulator satisfies the condition Zl<Zc. This embodiment will be described further in detail referring to FIG. 2.

FIG. 2 shows the change of optical response on frequency where the characteristic impedance Zc of the modulating electrode is set at 40 $\Omega$ and Zl of the terminating resistance is set at 30, 40 or 50 $\Omega$. In a prior optical modulator, the impedance Zl of the terminating resistance is higher than the impedance Zc of the electrode (Zc<Zl), resulting in the characteristics shown as dotted lines of FIG. 2. That is, the optical response is considerably reduced from a low frequency band for example about 1 GHz), and then monotonously reduced as the frequency is higher. Further, the gain of the signal source for driving the optical modulator tends to be also monotonously reduced as the frequency is made higher. The total modulation characteristic of the signal source and optical modulator is provided as a synthesis of the frequency characteristics of optical response of the optical modulator and that of the gain of the signal source. The modulation characteristics is thus considerably deteriorated as the frequency is higher, so that the difference of the modulation properties at a low frequency band of 1 GHz or lower and those in a high frequency band is increased. Thus, it may cause a problem that the distortion of the modulated signal is increased.

On the contrary, the characteristic impedance Zc of the modulating electrode is made higher than the impedance Zl of the terminating resistance (Zl<Zc) in the embodiment. It is thus possible to reduce the distortion of the modulated signal on the frequency change. For example, as shown in dashed line in FIG. 2, Zl=30 Ω and Zc=40 Ω, so that the impedance Zl of the terminating resistance is made lower. In this case, the optical response is once increased in a low frequency band, and then monotonously reduced as the frequency is higher. On the contrary, the gain of the signal source is monotonously reduced as the frequency is higher. The increase of the optical response may effectively cancel the decrease of the gain of the signal source compared with the characteristics shown in the dotted lines, so that the distortion of the modulated signal may be reduced as a whole. Consequently, the modulating characteristics may be made more constant than a prior modulator as a whole of the signal source and optical modulator in the embodiment. The distortion of the modulated signal may be effectively reduced.

Besides, in the example shown in FIG. 2, the optical response is shown for each of the examples where Zl=30 to 50 Ω and Zc=40 Ω. However, substantially the same results are obtained under the other numerical conditions.

The above studies are effective irrelevant of the value of the impedance Zi of the signal source. On the other hand, Japanese Patent number 3088988 discloses a general case only where Zi=50 Ω. However, as described above, when the impedance Zl is reduced maintaining Zi at 50 Ω, a relatively large voltage drop may occur in the input resistance of the signal source according to the law of potential division. The voltage applied on the modulating electrode is thus relatively reduced, so that the modulating efficiency is reduced and driving voltage is increased. Zi may thus preferably be made lower than Zl and/or Zc.

On the viewpoint of effects of the present invention, a difference between the impedance Zi of the signal source and the impedance Zl of the terminating resistance may preferably be 1 Ω or larger, and more preferably be 3 Ω or larger.

However, as the characteristic impedance Zi of the signal source is lower, impedance mismatch of the modulating electrode and signal source may occur to result in reflection, so that the stability of the signal source is deteriorated. On the viewpoint, a difference between Zi and Zl may preferably be 30 Ω or smaller.

On the viewpoint of effects of the present invention, a difference between the characteristic impedance Zi of the signal source and characteristic impedance Zc of the modulating electrode may preferably be 1 Ω or larger, and more preferably be 3 Ω or larger.

However, a difference between Zi and Zc may preferably be 30 Ω or smaller for avoiding the impedance mismatch as described above.

A difference between the impedance Zl of the terminating resistance and impedance Zc of the modulating electrode may preferably be 5 Ω or larger, and more preferably be 10 Ω or larger, for more constant modulating characteristics.

Further, in a prior travelling wave type optical modulator, the characteristic impedance Zi of the signal source is commonly standardized at 50 Ω. However, according to the present invention, the characteristic impedance Zi of the signal source is made lower than those of the modulating electrode and terminating resistance, as described above. In this case, when the characteristic impedance Zi of the signal source is set at 50 Ω, it is difficult to increase the impedance Zc of the modulating electrode sufficiently larger than 50 Ω due to the properties of a material and limitation of the design of the modulator. It is thus preferred to reduce the characteristic impedance Zi of the signal source at a value of 50 Ω or lower, and further 45 Ω or lower, for increasing the difference of Zi and Zc.

Each of the embodiments according to the first and second aspects of the present invention may be applied on the following third and fourth aspects of the present invention.

The third aspect of the present invention provides an optical modulator having a main body made of an electrooptic material and one and the other main faces opposing each other, optical waveguide for propagating light and an electrode provided on the main body for modulating the light. The electrode includes a coplanar type electrode arrangement having an electrode gap of 38 μm or smaller, and the main body has a thickness of 20 μm or smaller in a region of the optical waveguide.

The electrode gap is reduced and the thickness of the main body is made 20 μm or smaller in a region of an optical waveguide, as described above. The velocity matching may be realized and the driving voltage of the optical waveguide may be considerably reduced. The present invention is based on the discovery.

It has been known that as an electrode gap is reduced, a voltage applied to an optical waveguide is increased so that the driving voltage may be reduced. It has been further known that the velocity matching may be realized by reducing the thickness of the main body (Japanese Patent publication 10-133159A). However, The inventors have found that the driving voltage may be considerably and synergetically reduced by reducing the electrode gap to a value of 38 μm or lower and the thickness of the main body to a value of 20 μm or lower.

In a preferred embodiment, the electrode gap of the modulating electrode is 38 μm or smaller so that the driving voltage may be further reduced.

In a preferred embodiment, a supporting body joined with the main body is provided. It is thus possible to impart a mechanical strength sufficient for handling the main body. However, in an optical modulator having such supporting body, inner stress may be induced due to the difference between the thermal expansion coefficients of a low dielectric material and the electrooptic material for the main body. The stress may result in cracks in the electrooptic material (such as crystal). Further, the inner stress may induce the reduction of stability of modulation thereof.

The inner stress was studied in detail using finite element method. It was thus proved that the stress between the low dielectric layer and main body in the modulator having the low dielectric layer of a thickness of 10 μm is made lower than ⅓ of that of the modulator having the low dielectric layer of a thickness of 200 μm. The inner stress may be thus considerably reduced. Consequently, the inner stress may be considerably reduced by reducing the thickness of the low dielectric layer to a value of 200 μm or lower, more preferably 150 μm or lower, and most preferably 110 μm or lower.

However, when the thickness of the low dielectric layer is reduced, the proportion of electric field leaked into the supporting body is increased. The effective refractive index of microwave is increased to prevent the velocity matching at a high frequency, so that the modulation bandwidth decreases However, a proportion of the electric field leaked from the electrodes may be reduced by decreasing the electrode gap to a value of 38 µm or lower. The velocity matching may be thus attained using a thinner low dielectric layer. It is thus possible to reduce the inner stress and to produce the optical modulator at a higher production yield.

In an optical modulator having the low dielectric layer with a thickness of 200 µm or more, cracks may be induced in the main body when the modulator is subjected to a thermal shock test of 1000 thermal cycles, each cycle is between minus 40° C. to plus 80° C. However, the thickness of the low dielectric layer or adhesive layer is made 200 µm or smaller in the embodiment for reducing the inner stress. It is thus confirmed that the incidence of cracks is reduced. For example, when the thickness of the low dielectric or adhesive layer is 200 µm, it was proved that cracks were not found in 50 samples. In other words, reliability of the modulator production may be considerably improved by the invention.

In a preferred embodiment, the thickness of the main body is needed to be thinner as the electrode gap becomes small, on the viewpoint of the impedance matching. In a preferred embodiment, the thickness of the main body in a region of the optical waveguide is 15 µm or smaller, and more preferably be 10 µm or smaller. The driving voltage may be thereby reduced further.

Besides, according to Japanese Patent publication 10-133159A, it is difficult to reduce the thickness of the main body to 10 µm or smaller because of an increase of optical loss in an optical waveguide. The inventors have studied further, however, and it was proved to be possible to reduce the thickness to a value of 10 µm or smaller while forming an optical waveguide having a low optical loss, by controlling the mechanical processing. It becomes thus possible to provide an optical waveguide in such a thin main body, resulting in a considerable decrease of the driving voltage.

FIGS. 3 and 4 show the relationship of the thickness of the main body (lithium niobate substrate), electrode gap of the optical modulator and a product (V·cm) of a half wavelength voltage V and electrode length (cm). As the electrode gap is smaller, the product of the half wavelength voltage and electrode length is lower. In addition to this, as the thickness of the main body is smaller, it was proved that the product of half wavelength voltage and electrode length is lower.

Further, a fourth aspect of the present invention provides an optical modulator having a main body made of an electrooptic material and one and the other main faces opposing each other, an optical waveguide for propagating light and an electrode provided on the main body for modulating the light. The electrode includes an asymmetric coplanar strip line type electrode arrangement having an electrode gap of 19 µm or smaller, and the main body has a thickness of 20 µm or smaller in a region of the optical waveguide.

The optical modulator of this embodiment relates to electrode configuration of so called asymmetric coplanar strip line type. The invention provides the advantageous effects described above. In the present aspect, the electrode configuration is of so called asymmetric coplanar strip line type, and the electrode gap in the modulating electrode is set at 19 µm or less (a half of 38 µm or less).

The width of a center electrode may be preferably larger for facilitating the electrical connection of the center electrode and a connector pin in a feedthrough portion. Moreover, a conductive layer may be provided on the surface of the supporting body to shield electromagnetic wave and to improve the microwave characteristic. In these cases, the characteristic impedance of the feedthrough portion of the optical modulator tends to be lowered, resulting in mismatching with the characteristic impedance Zi of the signal source. In the third and fourth aspects of the present invention, a low dielectric portion having a dielectric constant lower than that of the electrooptic material for the main body may be provided direct under the main body. It is thus possible to increase the characteristic impedance of the feedthrough portion of the optical modulator.

Further, when the first and/or second aspect of the present invention is applied in the third or fourth aspect of the present invention, the electrode gap may be further reduced (narrowed) to result in a lower driving voltage. This embodiment will be described below further in detail.

As the electrode gap is smaller, the characteristic impedance of microwave of the electrode is also lowered. In a prior optical modulator based on impedance matching at 50 Ω, the optical response of the modulator is considerably reduced in a low frequency band due to impedance mismatching. The modulation bandwidth is thus considerably narrowed.

It is possible to increase the characteristic impedance to a value near 50 Ω by reducing the thickness of the main body of the optical modulator as the electrode gap is reduced as described above. It is, however, difficult to reduce the thickness of the main body to a value of 3 µm or lower, because the mechanical strength of the main body is lowered and the mode size of the optical waveguide is reduced so that the connection loss with an optical fiber is increased. That is, a practical minimum value of the electrode gap is limited by a minimum value of the thickness of the main body which may be easily processed and utilized.

It is, however, possible to perform efficient modulation even in an optical modulator having a low characteristic impedance by optimizing the proportions of impedances according to the third and fourth aspects of the present invention. It is thus possible to further reduce the electrode gap beyond the limitation of minimum thickness of the main body. The driving voltage may be thus further reduced compared with the modulator applying only the first or second aspect of the present invention.

The third and/or fourth aspects of the present invention and the embodiments described above may be applied in the embodiments of the first or second aspect of the present invention.

These and other objects, features and advantages of the invention will be appreciated upon reading of the following description of the invention when taken in conjunction with the attached drawings, with the understanding that some modifications, variations and changes of the same could be easily made by the skilled person in the art.

DETAILED DESCRIPTION OF PREFERRED EMBODIMENTS

Embodiments of each of the first, second, third and fourth aspects will be described further.

Figure 5:
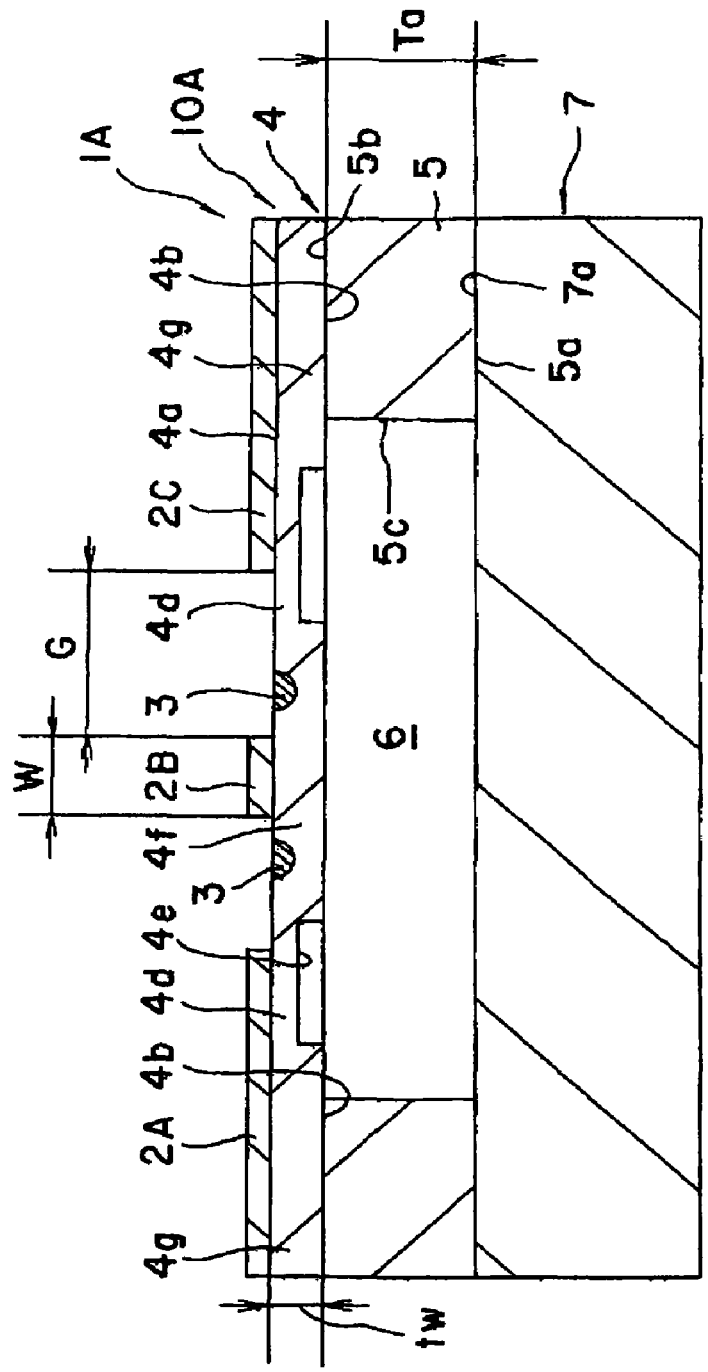
FIG. 5 is a cross sectional view schematically showing an optical modulator 1A.

FIG. 5 is a cross sectional view schematically showing an optical modulator 1A which may be applied in the first, second, third and fourth embodiments of the present invention.

The optical modulator 1A has an optical waveguide substrate 10A and a supporting body 7. The main body 4 and supporting body 7 are plate-shaped. Predetermined electrodes 2A, 2B and 2C are formed on a main face 4a of the main body 4. 2A and 2C represent ground electrodes, and 2B represents a center electrode in the present example. It is applied a so called coplanar waveguide type electrode (CPW electrode) configuration in this example. In the present example, a pair of optical waveguides 3 are formed between the ground electrode 2A and center signal electrode 2B and between the center electrode 2B and ground electrode 2C, respectively. A signal voltage may be applied onto each of the waveguides 3 in a direction substantially parallel with the main face. The optical waveguide 3 is of Mach-Zehnder type structure. Such Mach-Zehnder type pattern itself is well known and its planar pattern is omitted. A recess 4e is formed on the side of the other main face 4b of the main body 4. Two first thinner portions 4d and one first thinner portion 4f face the recess 4e. The portion 4f is provided between a pair of the thinner portions 4d. A base 4g is provided outside of each thinner portion 4d.

The one main face 7a of the supporting body 7 is joined with the other main face 4b of the main body 4 with a joining layer 5. 5a and 5b represent joining faces and 5c represents an exposed face to a space 6.

According to such modulator, the strength of the whole modulator may be preserved by the supporting body 7 with a relatively large thickness, providing a strength sufficient for handling to the modulator. The warping of the main body 4 may also be prevented. The thickness "tw" of the thinner portion 4f of the main body 4 may be also reduced to, for example, 20 μm or lower. It is thus possible to improve the propagation velocity of microwave in the electrodes, while the driving voltage may be made lower as described above.

Figure 6:
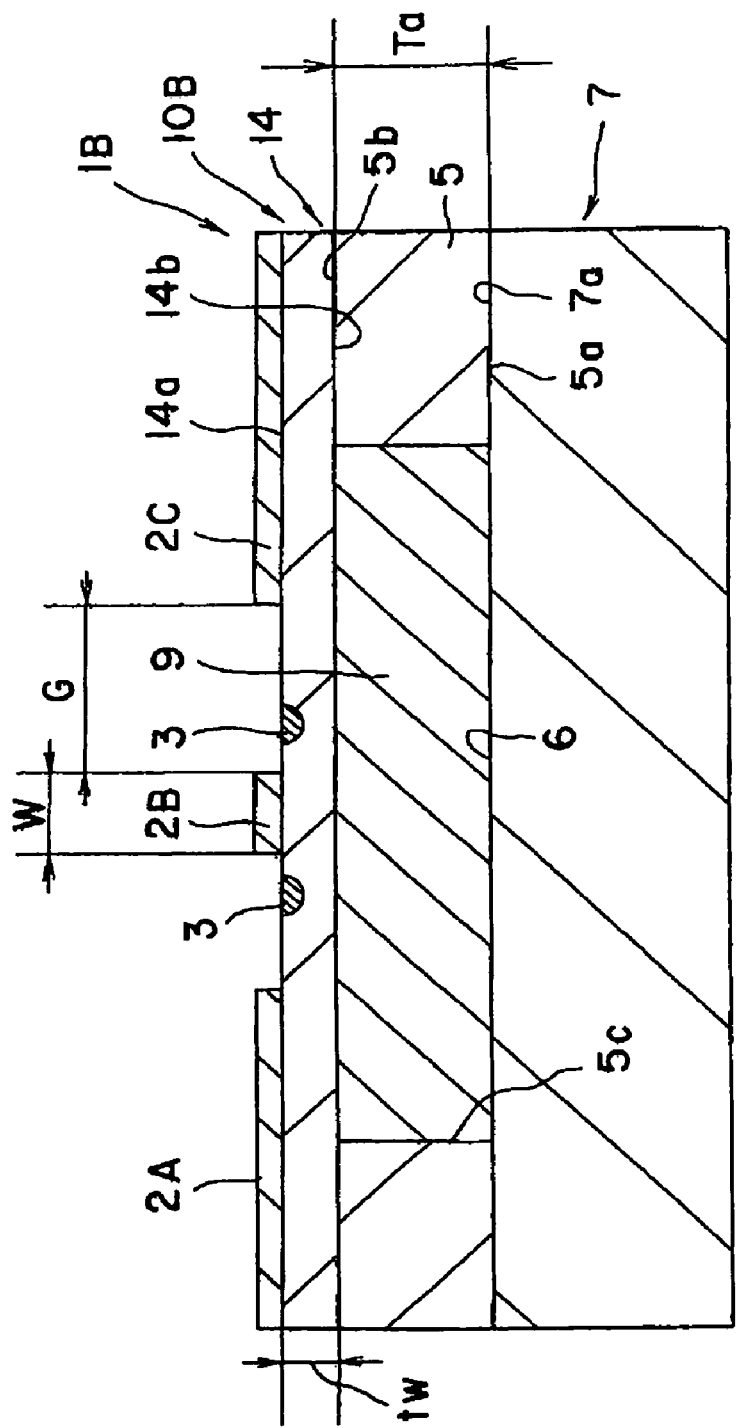
FIG. 6 is a cross sectional view schematically showing an optical modulator 1B.

FIG. 6 shows a traveling wave type optical modulator 1B having an optical waveguide substrate 10B and supporting body 7. The supporting body 7 and main body 14 are both plate shaped. In the present example, a low dielectric material 9 having a dielectric constant lower than that of an electrooptic material for the main body 14 is filled in a space 6. Further, predetermined electrodes 2A, 2B and 2C are formed on one main face 14a of the main body 14. The other main face 14b of the main body 14 is joined with the supporting body 7 through the joining layer 5.

Figure 7:
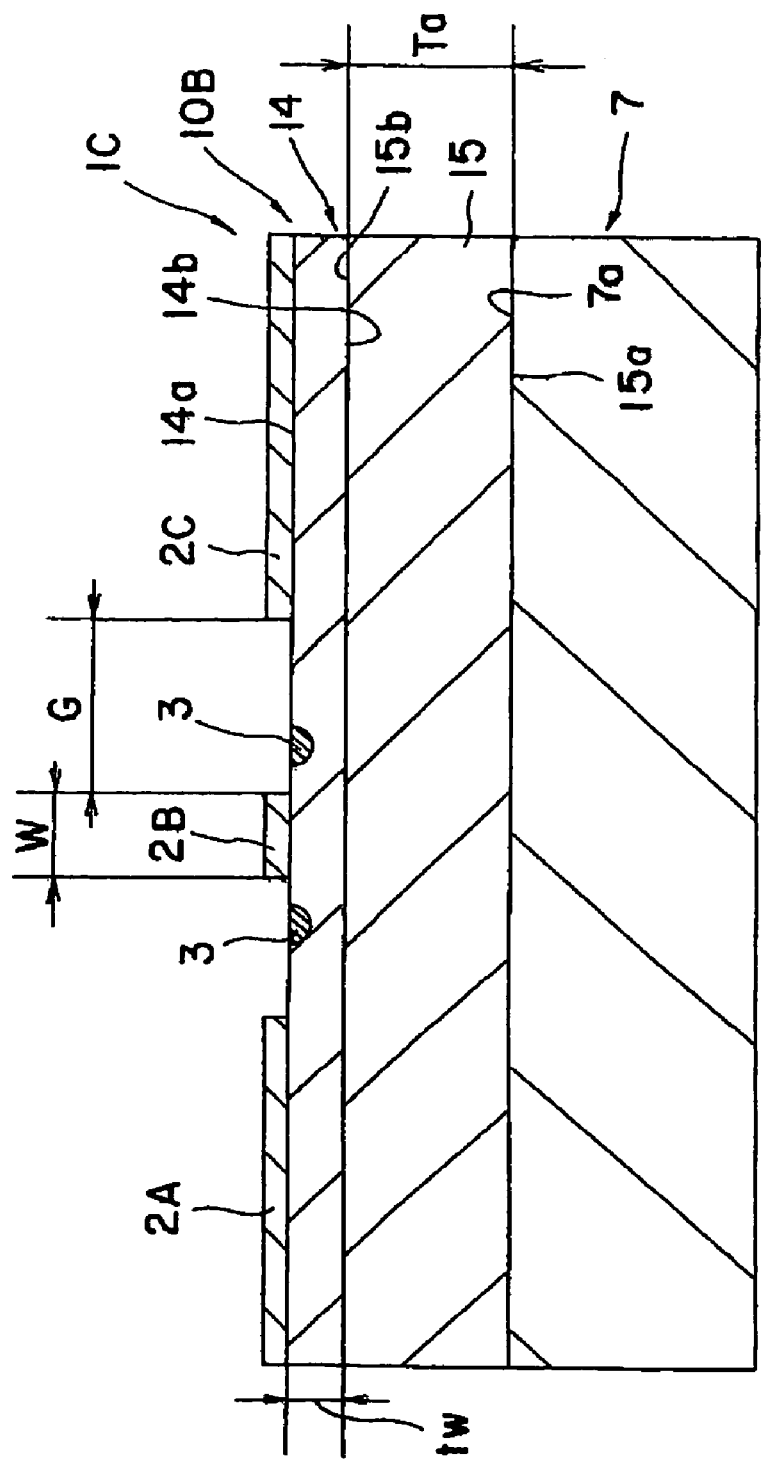
FIG. 7 is a cross sectional view schematically showing an optical modulator 1C.

FIG. 7 shows an optical modulator 1C having an optical waveguide substrate 10B, a supporting body 7 and a joining layer 15 joining them. The substrate 1B has a main body 14 having a shape of a flat plate as that in FIG. 6. Electrodes 2A, 2B and 2C of coplanar type configuration are provided on the main body 14. The main face 15b of the joining layer 15 contacts the main face 14b of the main body 14, and the main face 15a contacts the main face 7a of the supporting body 7.

Figure 8:
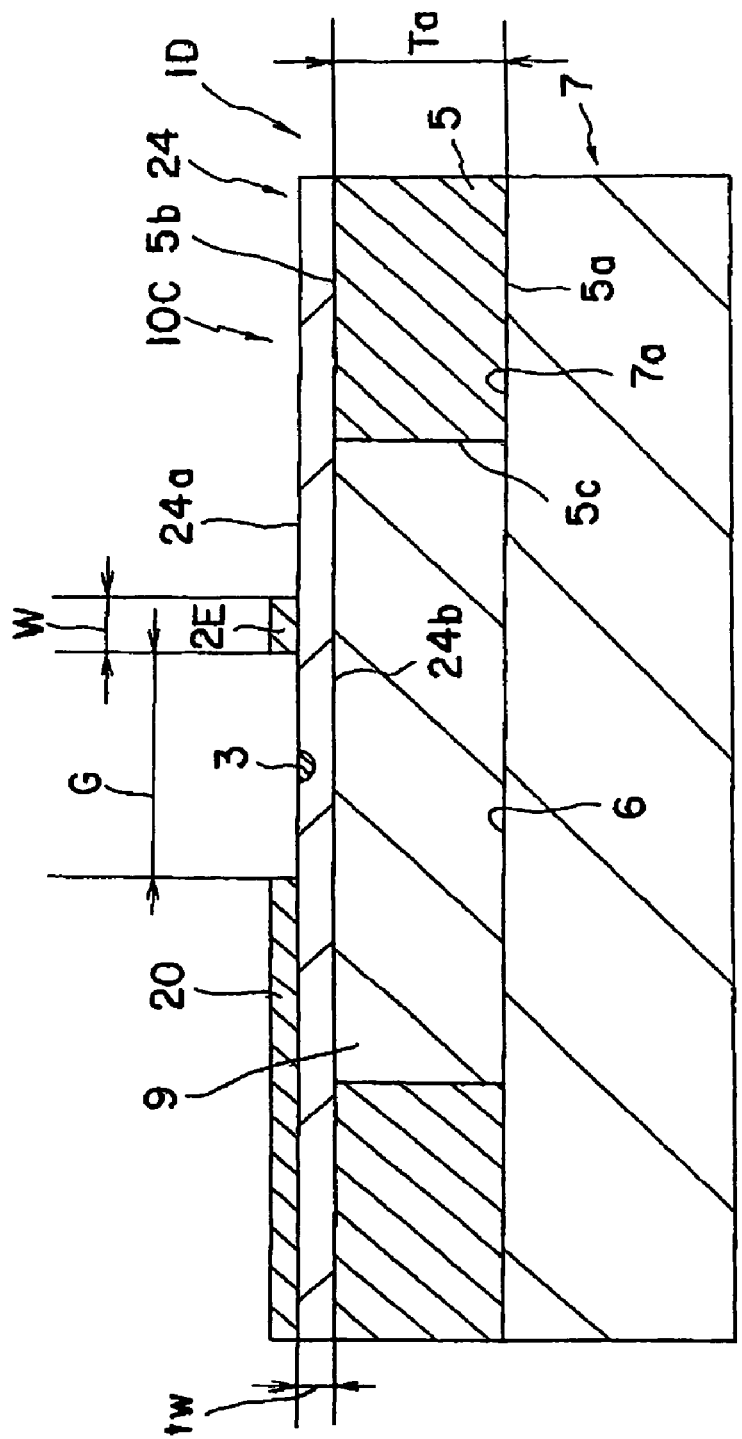
FIG. 8 is a cross sectional view schematically showing an optical modulator 1D.

FIG. 8 shows an optical modulator 1D having an optical waveguide substrate 10C and a supporting body 7. The supporting body 7 and main body 24 are both plate shaped. The other main face 24b of the main body 24 is joined with the supporting body 7 through the joining layer 5. In the present example, a low dielectric material 9 having a dielectric constant lower than that of the electrooptic material for the main body 24 is filled in a space 6. Further, predetermined electrodes 2D and 2E are formed on one main face 24a of the main body 24 according to so called asymmetric coplanar strip line (A-CPS) type electrode configuration. An optical waveguide 3 is provided between adjacent electrodes 4D and 4E so that a signal voltage may be applied on the optical waveguide 3 substantially in a direction parallel with the main face of the main body. The thickness "tw" of the main body 14 is made 20 μm or smaller in the fourth aspect of the present invention.

The invention may be applied to a travelling wave optical modulator of so called independent modulation type.

In a preferred embodiment, as shown in FIGS. 6, 7 and 8, the low dielectric material 9 with a dielectric constant lower than that of the electrooptic material is directly contacted with the other main face (back face) of the main body. It is thus possible to directly support the thin main body from the other main face (back face). Such low dielectric material includes a glass, an adhesive such as epoxy resin or acrylic resin series adhesives, a layer insulator for producing a semiconductor, and polyimide resin.

The main body for the optical waveguide substrate is made of an electrooptic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz. Lithium niobate, lithium tantalate and lithium niobate-lithium tantalate solid solution single crystals are particularly preferred.

The electrode may be made of a material not particularly limited so long as it has a low resistance and excellent impedance property, including gold, silver, copper or the like.

The supporting body may preferably be made of a material having a dielectric constant lower than that of the electrooptic material for minimizing the adverse effects of the supporting body on the velocity of propagation of microwave. Such material includes a glass such as quartz glass.

A buffer layer may be provided between the surface (main face) of the main body and electrode. The buffer layer may be made of any known materials such as silicon dioxide, magnesium fluoride, silicon nitride and alumina.

The optical waveguide is formed in or on the main body and preferably on the side of the one main face. The optical waveguide may be a ridge type optical waveguide directly formed on the one main face of the main body, or a ridge type optical waveguide formed on another layer on the one main face of the main body. Alternatively, the optical waveguide may be an optical waveguide formed by inner diffusion process such as titanium diffusion process, or an optical waveguide produced by ion exchange process such as proton exchange. The electrode may be on the side of the one main face of the one main body as described above. The electrode may be directly formed on the one main face of the main body, or may be formed on the buffer layer on the one main face.

In the main body, the polarization axis of the crystal is substantially parallel with the one main face (surface) of the main body. In this case, the main body may preferably be composed of an X-plate or Y-plate made of single crystal of lithium niobate, lithium tantalate or lithium niobate-lithium tantalate solid solution. The present invention is applied to such X or Y-plate in the examples described referring to FIGS. 5 to 8.

Further in another preferred embodiment, the polarization axis of the crystal is substantially perpendicular to the one main face (surface) of the substrate. In this case, the main body may preferably be composed of a Z-plate made of single crystal of lithium niobate, lithium tantalate or lithium niobate-lithium tantalate solid solution. When such Z-plate is used, it is necessary to provide an optical waveguide direct under the electrodes. It is thus preferred to provide the buffer layer between the surface of the main body and electrode for reducing the propagation loss of light.

Further in a preferred embodiment, as shown in FIG. 5, the main body has a first thinner portion and a second thinner portion both facing the recess, in which the first thinner portion has a thickness larger than that of the second thinner portion. The optical waveguide is provided within the first thinner portion.

The optical waveguide substrate and supporting body may be joined with a method not particularly limited. In a preferred embodiment, they are joined with an adhesive agent. In this case, the refractive index of the adhesive agent may preferably be lower than that of the electrooptic material constituting the main body. Addition to this, the dielectric constant of the adhesive agent may preferably be lower than that of the electrooptic material constituting the main body.

The kind of such adhesive agent is not particularly limited as far as it satisfies the aforementioned conditions. The adhesive includes an epoxy adhesive, a thermal setting type adhesive, an ultraviolet curable adhesive, and a ceramic adhesive having a thermal expansion coefficient near that of the electrooptic material such as lithium niobate, for example "ALON CERAMICS C" (manufactured by Toa Gosei Co., Ltd.: a thermal expansion coefficient of $13 \times 10^{-6}$/K.

For producing the optical modulators shown in FIGS. 5 to 8, a sheet made of a joining agent is interposed between the back face of the main body and the supporting body to join them. Preferably, a sheet made of an adhesive of a thermosetting resin, photoresist resin or light thickening resin is interposed between the back face of the main body and the supporting body and then cured.

Such sheet may preferably be a film made of a resin having a thickness of not larger than 300 $\mu$m, including "T-2000" (supplied by Hitachi Chemical Co. Ltd.), "CARBODILITE FILM" (supplied by Nisshinbo Industries Inc.) and "A-1400", "A-1500" and "A-1600" (supplied by Nagase Chemtech).

Particularly, as shown in FIGS. 5 to 8, a plate-shaped supporting body 26 may be adhered with the supporting body 4 by a sheet of a resin adhesive. In this case, It is not necessary to form a recess in the supporting body 26, further improving the productivity.

EXAMPLES (Production)

An optical modulator 1B shown in FIG. 6 was produced. An X-cut 3 inch wafer (made of LiNbO$_3$ single crystal) was used as a substrate. An optical waveguide 3 of Mach-Zehnder type was formed in the surface area of the wafer by titanium diffusion and photolithography. The size of the optical waveguide 3 may be set at, for example, 10 $\mu$m at $1/e^2$. The above described CPW electrode pattern was formed by electroplating.

A resist film was coated onto the one main face (surface) of the wafer-shaped bulk for the main body. The bulk was then adhered with a base substrate made of lithium niobate using a thermoplastic resin. The back face 4b of the main body was then subjected to horizontal polishing, high speed lapping and polishing (CMP). The thickness of the resulting main body was measured by means of a topographic measuring instrument, so that a desired thickness was obtained.

A sheet having a thickness of 50 $\mu$m and made of an epoxy thermosetting resin was set between the main body 4 and supporting body 7, and heated at 80° C. to thermally cure the sheet to form the joining layer 5. The main body 4 and supporting body 7 were thus joined with each other. The same epoxy resin as the sheet (or air) is provided inside of the joining layer 5. The wafer was then removed from the surface plate, and washed with an organic solvent to remove stick wax. The wafer was then cut with a dicing saw working machine to obtain optical chips 1B. Each chip was subjected to optical polishing at the end face of the optical waveguide formed therein.

(Simulation 1)

Numerical calculation was carried out using finite element method (FEM) on the above optical modulator 1B. The thickness "tw" of the main body 4 is 13 $\mu$m, and the width "W" of the center electrode is 30 $\mu$m, The electrode gap "G" was 40 $\mu$m and the thickness "Ta" of the low dielectric material 9 was made sufficiently large. The calculation provided microwave properties, which were used to compare the modulation efficiencies when the impedances Zi, Zl and Zc were variously changed. The calculation was performed according to "Estimation of frequency response for high-speed LiNbO3 optical modulators" (O.Mitomi et al.) in "IEE Proceeding Optoelrctronics" Vol. 146, No2, pp.99–104, April 1999. In the example of calculation, the characteristic impedance "Zi" of the signal source attaining the velocity matching was set at 50 Ω. Ratios of the impedance Zl of the terminating resistance and the characteristic impedance Zc of the modulating electrode to Zi were changed as shown in table 1. The power of the output modulated-wave where Zi=Zl=Zc was taken as a reference. The power of output-modulated wave where Zc/Zi and Zl/Zi were changed in table 1 with respect to the reference were calculated, and shown in table 1.

TABLE 1

| Zl/ | modulation efficiency (dB) (f = 30 GHz) | | | | |
|---|---|---|---|---|---|
| | Zc/Zi | | | | |
| Zi | 0.6 | 0.8 | 1.0 | 1.2 | 1.4 |
| 0.6 | −4.4 | −2.9 | −1.9 | −1.2 | −0.7 |
| 1.0 | −2.6 | −1.0 | 0.0 | 0.8 | 1.3 |
| 1.4 | −1.0 | 0.5 | 1.6 | 2.39 | 3.0 |

(Simulation 2)

Figure 1:
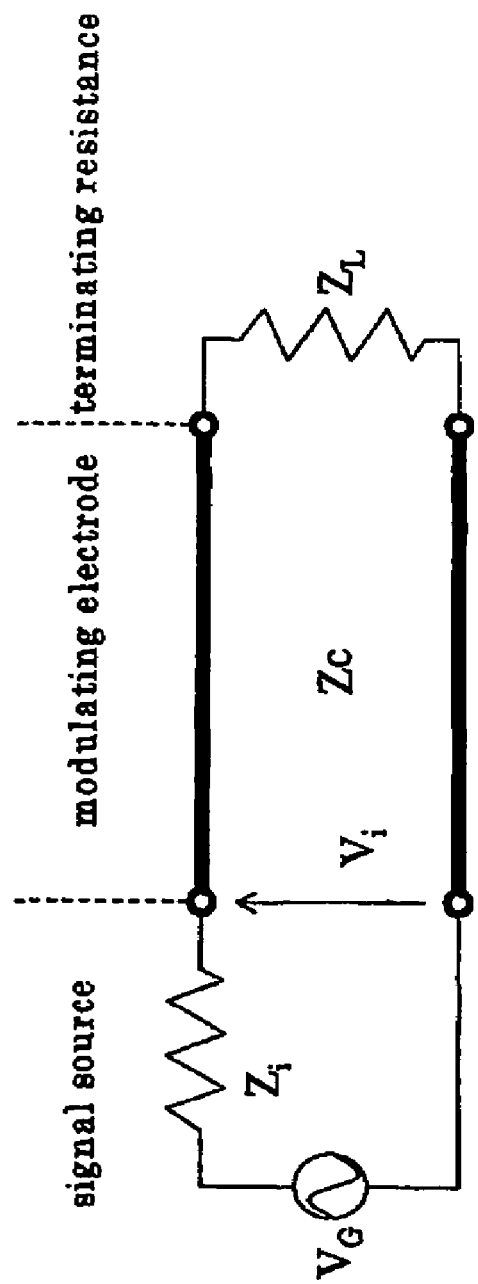
FIG. 1 is an equivalent circuit diagram of an optical modulator.
Figure 2:
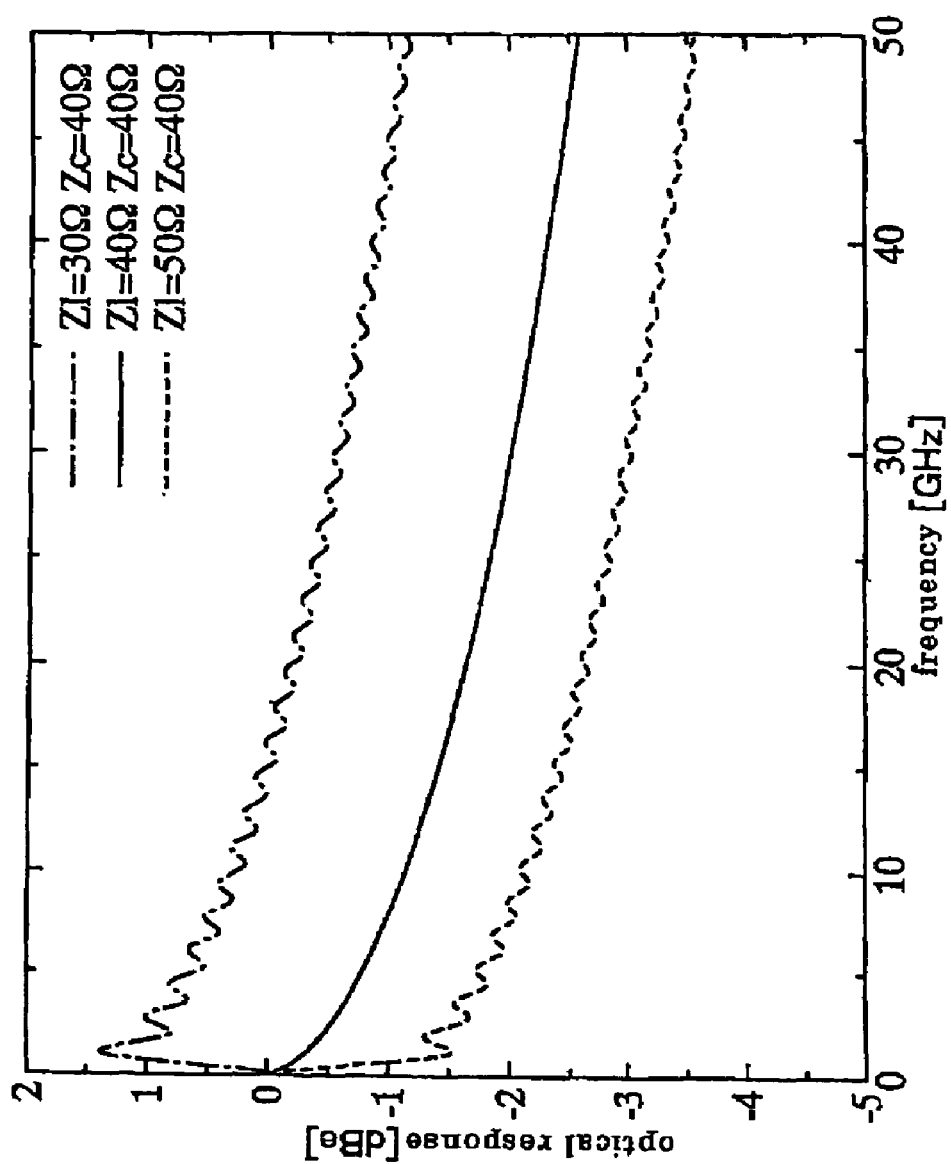
FIG. 2 is a graph showing the frequency change of optical response when Zl and Zc are changed.

Numerical calculation was carried out using finite element method (FEM) on the above optical modulator 1B. The thickness "tw" of the main body 4 was 13 $\mu$m, the width "W" of the center electrode was 30 $\mu$m, the electrode gap "G" was 40 $\mu$m and the thickness "Ta" of the low dielectric material 9 was made sufficiently large. The characteristic impedance "Zi" of the signal source attaining the velocity matching was set at 50 Ω. The impedance Zl of the terminating resistance and the characteristic impedance Zc of the modulating electrode were changed as shown in FIG. 2. The optical response was calculated in a frequency range of 0 to 50 GHz. The results were shown in FIG. 2.

(Simulation 3)

Figure 3:
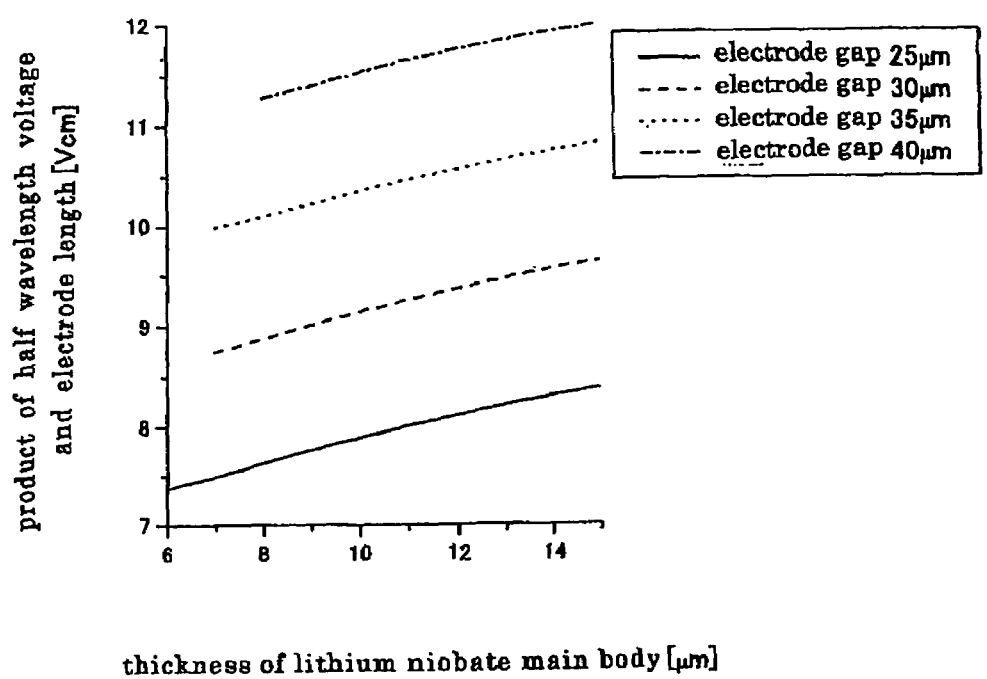
FIG. 3 is a graph showing the relationship of the thickness of a main body, an electrode gap and a product of a half wavelength voltage and electrode length.

Numerical calculation was carried out using finite element method (FEM) on the above optical modulator 1B. The width "W" of the center electrode was 30 μm, and the thickness "Ta" of the low dielectric material 9 was 50 μm. The thickness "tw" of the main body 4 and the electrode gap G were changed as shown in FIG. 3. The product of a half wavelength voltage and electrode length was calculated and the results were shown in FIG. 3.

(Simulation 4)

Figure 4:
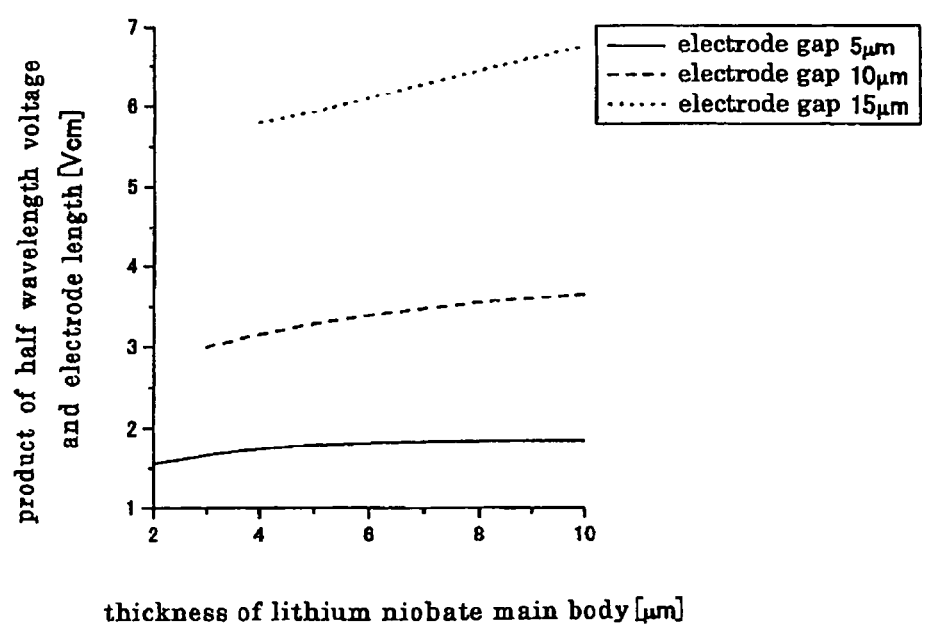
FIG. 4 is a graph showing the relationship of the thickness of a main body, an electrode gap and a product of a half wavelength voltage and electrode length.

Numerical calculation was carried out using finite element method (FEM) on the above optical modulator 1B. The width "W" of the center electrode was 10 μm, and the thickness "Ta" of the low dielectric material 9 was 50 μm. The thickness "tw" of the main body 4 and the electrode gap "G" were changed as shown in FIG. 4. The product of a half wavelength voltage and electrode length was calculated and the results were shown in FIG. 4

As described above, the modulation efficiency of an optical modulator in a high frequency band can be improved while satisfying velocity matching condition.

The present invention has been explained referring to the preferred embodiments, however, the present invention is not limited to the illustrated embodiments which are given by way of examples only, and may be carried out in various modes without departing from the scope of the invention.

The invention claimed is:

1. An optical modulator comprising an optical waveguide for propagating light, an electrode for applying a voltage on said optical waveguide for modulating said light, a signal source electrically connected to said electrode and a terminating resistance electrically connected to said electrode;

wherein said signal source has a characteristic impedance Zi and said terminating resistance has an impedance Zl satisfying the formula Zi<Zl.

2. The optical modulator of claim 1, wherein said electrode has a characteristic impedance Zc satisfying the following formula:

$$Zi<Zc.$$

3. The optical modulator of claim 1, wherein said electrode has a characteristic impedance Zc satisfying the following formula:

$$Zl<Zc.$$

4. The optical modulator of claim 1, wherein Zi is 50 Ω or lower.

5. The optical modulator of claim 1, further comprising an optical waveguide substrate made of an electrooptic material and having one and the other main faces opposing each other, wherein said optical waveguide and said electrode are provided on said optical waveguide substrate.

6. The optical modulator of claim 5, further comprising a supporting body joined with said optical waveguide substrate.

7. The optical modulator of claim 5, further comprising a low dielectric portion having a dielectric constant lower than that of said electrooptic material.

8. An optical modulator comprising an optical waveguide for propagating light, an electrode for applying a voltage on said optical waveguide for modulating said light, a signal source electrically connected to said electrode and a terminating resistance electrically connected to said electrode;

wherein said signal source has a characteristic impedance Zi and said electrode has a characteristic impedance Zc satisfying the following formula:

$$Zi<Zc.$$

9. The optical modulator of claim 8, wherein said terminating resistance has an impedance Zl satisfying the following formula:

$$Zl<Zc.$$

10. The optical modulator of claim 8, wherein Zi is 50 Ω or lower.

11. The optical modulator of claims 8, further comprising an optical waveguide substrate made of an electrooptic material and having one and the other main faces opposing each other, wherein said optical waveguide and said electrode are provided on said optical waveguide substrate.

12. The optical modulator of claim 11, further comprising a supporting body joined with said optical waveguide substrate.

13. The optical modulator of claim 11, further comprising a low dielectric portion having a dielectric constant lower than that of said electrooptic material.

14. The optical modulator of claim 11, wherein said optical waveguide substrate comprises a first thinner portion, and a second thinner portion having a thickness smaller than that of said first thinner portion, wherein said optical waveguide is formed in said first thinner portion.

15. An optical modulator, comprising:

a main body made of an electrooptic material and one and the other main faces opposing each other, an optical waveguide for propagating light and an electrode provided on said main body for modulating said light;

wherein said electrode comprises a coplanar type electrode arrangement having an electrode gap of 38 μm or smaller, and said main body has a thickness of 20 μm or smaller in a region of said optical waveguide;

a supporting body joined with said main body; and a low dielectric layer having a thickness of 200 μm or lower for joining said main body and supporting body.

16. The optical modulator of claim 15, wherein said supporting body comprises a material having a dielectric constant lower than that of said main body.

17. The optical modulator of claim 15, wherein said supporting body comprises a material having a linear expansion coefficient matching with that of said main body.

18. The optical modulator of claim 15, wherein said main body comprises a first thinner portion, and a second thinner portion having a thickness smaller than that of said first thinner portion, wherein said optical waveguide is formed in said first thinner portion.

19. The optical modulator of claim 15, comprising a signal source and terminating resistance both electrically connected with said electrode, wherein said signal source has a characteristic impedance Zi and said terminating resistance has an impedance Zi satisfying the following formula:

$$Zi<Zl.$$

20. The optical modulator of claim 15, comprising a signal source and terminating resistance both electrically connected with said electrode, wherein said signal source has a characteristic impedance Zi and said electrode has a characteristic impedance Zc satisfying the following formula:

$$Zi<Zc.$$

21. The optical modulator of claim 15, comprising a signal source and terminating resistance both electrically connected with said electrode, wherein said terminating resistance an impedance Zl and said electrode has a characteristic impedance Zc satisfying the following formula:

Zl<Zc.

22. An optical modulator comprising a main body made of an electrooptic material and one and the other main faces opposing each other, an optical waveguide for propagating light and an electrode provided on said main body for modulating said light;
 wherein said electrode comprises an asymmetric coplanar strip line type electrode arrangement having an electrode gap of 19 μm or smaller, and said main body has a thickness of 20 μm or smaller in a region of said optical waveguide.

23. The optical modulator of claim 22, further comprising a supporting body joined with said main body.

24. The optical modulator of claim 23, further comprising a low dielectric layer having a thickness of 200 μm or lower for joining said main body and supporting body.

25. The optical modulator of claim 23, wherein said supporting body comprises a material having a dielectric constant lower than that of said main body.

26. The optical modulator of claim 23, wherein said supporting body comprises a material having a linear expansion coefficient matching with that of said main body.

27. The optical modulator of claim 22, further comprising a low dielectric portion having a dielectric constant lower than that of said electrooptic material.

28. The optical modulator of claim 22, wherein said main body comprises a first thinner portion, and a second thinner portion having a thickness smaller than that of said first thinner portion, wherein said optical waveguide is formed in said first thinner portion.

29. The optical modulator of claim 22, comprising a signal source and terminating resistance both electrically connected with said electrode, wherein said signal source has a characteristic impedance Zi and said terminating resistance has an impedance Zl satisfying the following formula:

Zi<Zl.

30. The optical modulator of claim 22, comprising a signal source and terminating resistance both electrically connected with said electrode, wherein said signal source has a characteristic impedance Zi and said electrode has a characteristic impedance Zc satisfying the following formula:

Zi<Zc.

31. The optical modulator of claim 22, comprising a signal source and terminating resistance both connected with said electrode, wherein said terminating resistance has an impedance Zl and said electrode has a characteristic impedance Zc satisfying the following formula:

Zl<Zc.

* * * * *